United States Patent [19]

Ahlgren

[11] Patent Number: 4,525,651
[45] Date of Patent: Jun. 25, 1985

[54] CAPACITIVELY BALLASTED LOW VOLTAGE INCANDESCENT LAMP

[75] Inventor: Frederic F. Ahlgren, Shaker Heights, Ohio

[73] Assignee: General Electric Company, Schenectady, N.Y.

[21] Appl. No.: 630,997

[22] Filed: Jul. 16, 1984

Related U.S. Application Data

[63] Continuation-in-part of Ser. No. 379,412, May 18, 1982, abandoned.

[51] Int. Cl.³ .............. H05B 37/00; H05B 39/00; H05B 41/14
[52] U.S. Cl. ................. 315/240; 315/227 R; 315/291; 315/311; 315/DIG. 4; 323/209; 363/62
[58] Field of Search ........... 315/227, 240, 291, 307, 315/311, DIG. 4; 307/109; 363/62, 142; 323/209–211, 293, 352, 364, 370

[56] References Cited

U.S. PATENT DOCUMENTS

| 2,654,042 | 9/1953 | Clarke et al. | 315/58 X |
|---|---|---|---|
| 3,274,484 | 9/1966 | Gebhardt et al. | 315/240 |
| 3,597,652 | 8/1971 | Gates, Jr. | 315/311 |
| 3,921,032 | 11/1975 | Hallay | 315/106 |
| 4,185,231 | 1/1980 | Colliton | 315/189 |

FOREIGN PATENT DOCUMENTS

| 208114 | 12/1955 | Australia | 315/291 |
|---|---|---|---|
| 53-2970 | 1/1978 | Japan | 315/291 |
| 335618 | 9/1930 | United Kingdom . | |
| 397000 | 8/1933 | United Kingdom . | |
| 1329492 | 9/1973 | United Kingdom . | |
| 1350176 | 4/1974 | United Kingdom . | |
| 1415634 | 11/1975 | United Kingdom . | |
| 1567749 | 5/1980 | United Kingdom . | |
| 2077528 | 12/1981 | United Kingdom . | |

Primary Examiner—Saxfield Chatmon
Attorney, Agent, or Firm—John P. McMahon; Philip L. Schlamp; Fred Jacob

[57] ABSTRACT

A capacitively ballasted low voltage lamp comprising a main capacitor connected electrically in series with the lamp, across an alternating current source, and one or more auxiliary capacitors that can be connected electrically across the main capacitor by switching means for one or more source waveform cycles. The minimum lamp current is established by the main capacitor, with additional lamp current flowing through one or more auxiliary capacitors during one or more source waveform cycles.

7 Claims, 3 Drawing Figures

CAPACITIVELY BALLASTED LOW VOLTAGE INCANDESCENT LAMP

This application is a continuation-in-part of application Ser. No. 379,412, filed May 18, 1982, now abandoned.

CROSS-REFERENCE TO RELATED APPLICATIONS

U.S. patent application Ser. No. 379,411, Paul T. Cote, filed concurrently herewith for "Improved Capacitively Ballasted Low Voltage Incandescent Lamp" and assigned the same as this invention, now abandoned.

U.S. patent application Ser. No. 349,410, Paul T. Cote, filed concurrently herewith for "Power Supply for Low Voltage Incandescent Lamp" and assigned the same as this invention, now U.S. Pat. No. 4,447,765.

U.S. patent application Ser. No. 379,393, William P. Kornrumpf and Paul T. Cote, filed concurrently herewith, for "Improved Power Supply For Low Voltage Incandescent Lamp and Like Load" and assigned the same as this invention, now U.S. Pat. No. 4,447,764.

BACKGROUND OF THE INVENTION

The present application relates to ballast means and more particularly to a capacitively ballasted circuit providing low voltage to an incandescent lamp.

As is well known in the art, incandescent lamps operating at a nominal voltage of approximately 120 volts do not provide as high an efficacy, that is lumens per watt, at the same wattage as incandescent lamps operating at lower voltage levels. Prior art circuitry providing such lower voltage operation either exhibits undesirable cost, volume, weight, or high levels of electromagnetic interference. In particular, some prior art low voltage ballast means for incandescent lamps have utilized magnetic components for voltage transformation. The cost of such magnetic components has prevented the resulting power supplies from being economically attractive. Other ballast means have utilized phase-control techniques, in which very narrow pulses are required, with high surge currents flowing through the load; frequently resulting in electromagnetic interference and reduced reliability.

SUMMARY OF THE INVENTION

In accordance with the foregoing, it is an object of the present invention to provide a new and improved ballast means for a low voltage incandescent lamp having a relatively low cost.

Another object of the present invention is to provide a new and improved ballast means for a low voltage incandescent lamp which avoids producing undesirably high levels of electromagnetic interference.

These and other objects are provided by the present invention supplying line frequency current from a higher voltage alternating current (a.c.) source to a lower operating voltage lamp and comprising a main capacitor electrically in series with the lamp, the combination thereof electrically connected across the source, and one or more auxiliary capacitors electrically connected across the main capacitor by switching means for one or more a.c. source waveform cycles. The switching means, in a preferred embodiment, are responsive to a signal provided by a control logic means. The total variation of load current is controlled by the capacitance ratio of the main capacitor to the sum of the auxiliary and main capacitors.

DETAILED DESCRIPTION

Figure 1:
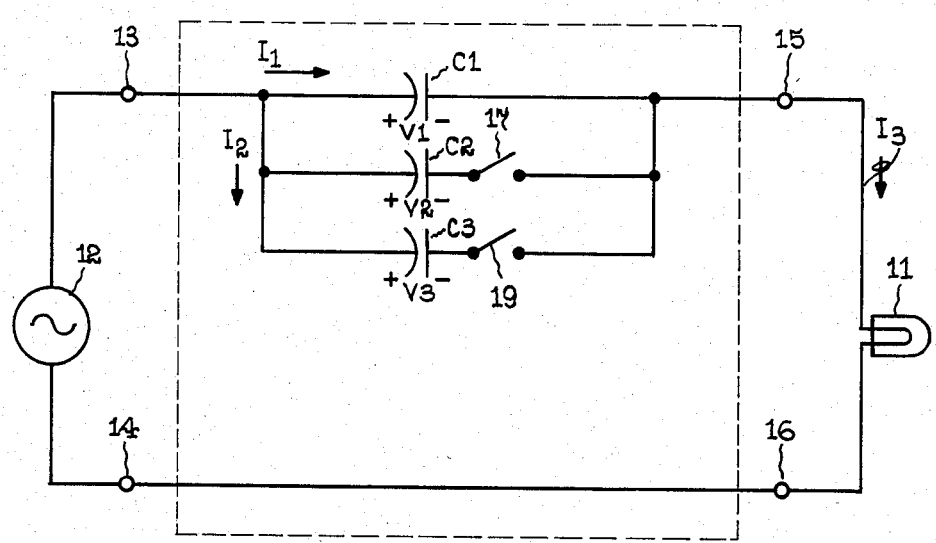
FIG. 1 is a schematical diagram of the present invention.

As shown in FIG. 1 a ballast means 10 provides power to a load 11, preferably an incandescent lamp, from an alternating current (a.c.) source 12 by controlling the current supplied to the load 11 from the a.c. source 12. Load 11 can be a low-voltage incandescent lamp operating at a voltage of, for example, between about twenty-four to thirty-six volts. The ballast means 10 enables the lamp load 11 to operate at a selectably fixed power output in a relatively small range of brightness. In such application, a relatively small range of lamp voltage can be maintained while the a.c. source 12 current is varied over a predetermined range, for example about 20%.

Ballast means 10 forms a capacitive voltage converter in which a minimum current flowing through the lamp is the current $I_1$ flowing through capacitor C1 hereinafter referred to as the main capacitor. An additional component of lamp current is due to the current $I_2$ flowing through one or more capacitors C2 and C3 hereinafter referred to as the auxiliary capacitors. Thus minimum lamp current and power occur when current does not flow through the auxiliary capacitors C2 and C3, that is, when the capacitive reactance of ballast means 10 is a maximum. Conversely, maximum lamp current and power occur when the capacitor current $I_2$ flows through all the auxiliary capacitors C2 and C3 resulting in a minimal ballast means capacitive reactance. An intermediate magnitude of lamp current and power is obtained when the current $I_2$ flows through some but not all of the auxiliary capacitors C2 and C3. Therefore, by changing the number of auxiliary capacitors C2 and C3 in parallel with the main capacitor C1, the load current and power are adjusted.

The a.c. source 12 and lamp 11 are electrically connected to terminals 13-14 and 15-16, respectively. Capacitor C1 is connected between terminals 13 and 15. For each auxiliary capacitors C2 and C3, there is a respective switching means 17 and 19 electrically connected between terminal 15 and one terminal of each of auxiliary capacitors C2 and C3. The remaining terminal of each auxiliary capacitors C2 and C3 is connected to terminal 13. Additionally, terminals 14 and 16 are electrically connected directly together.

Each of switching means 17 and 19 can be any device capable of controllably providing a low resistance, bidirectional current conduction path between terminal 15 and that terminal of each auxiliary capacitor C2 furthest from terminal 13 and can be either a mechanical or electronic switching device. For example, switching means 17 can be a semiconductor device, such as a triac, which is switched to a conductive and non-conductive state in response to a control signal from any control logic means, as is well known in the art. To prevent undesirable conduction and limit the current fow through each switching device 17, each switching device 17 is preferably, controllably switched "on" by control logic means 18 only when the respective voltage potentials between V1, across the main capacitor C1, and V2 and V3 respectively across auxiliary capacitors C2 and C3, are approximately equal and/or at approximately the maximum voltage of the a.c. source 12 waveform and thereby substantially eliminate any circulating current flowing between auxiliary capacitors C2 and C3 and main capacitor C1.

As previously disclosed, the present invention provides a ballast means 10 which controls the power supplied to the incandescent lamp 11 by varying the capacitance electrically in series therewith. More specifically, the total capacitance, electrically in series with the incandescent lamp 11, is equal to the parallel combination of the main capacitor C1 and all auxiliary capacitors C2 and C3 which respectively have switching means 17 and 19 in a conductive state. Thus by varying the number of auxiliary capacitors C2 which have their switching means 17 in a conductive state, the total capacitance in series with the incandescent lamp can be varied and thereby provide a ballast means 10 which regulates the power supplied to the incandescent lamp 11 and therefore regulates the lamp filament temperature.

Additionally each switching means 17 can switch and thereby electrically connect and disconnect an auxiliary capacitor in parallel to the main capacitor for one or more complete cycles of the a.c. source 12 waveform.

It should also be noted that the auxiliary capacitors C2 can each have the same capacitance as or different capacitances from each other. Each auxiliary capacitor can also be switched independently of each other. In a preferred embodiment the main capacitor C1 has a capacitance of approximately 25 microfarads, the total auxiliary capacitance is approximately 25 microfarads; the a.c. source 12 is at approximately 120 volts, 60 hertz and the lamp is operating at approximately 36 volts, 60 watts. The number of auxiliary capacitors C2 and C3 electrically connected in parallel with the main capacitor C1 and the capacitance of each capacitor can vary according to a number of factors including the a.c. source 12 voltage magnitude, desired lamp current, lamp brightness, lamp operating voltage, etc.

Figure 3:
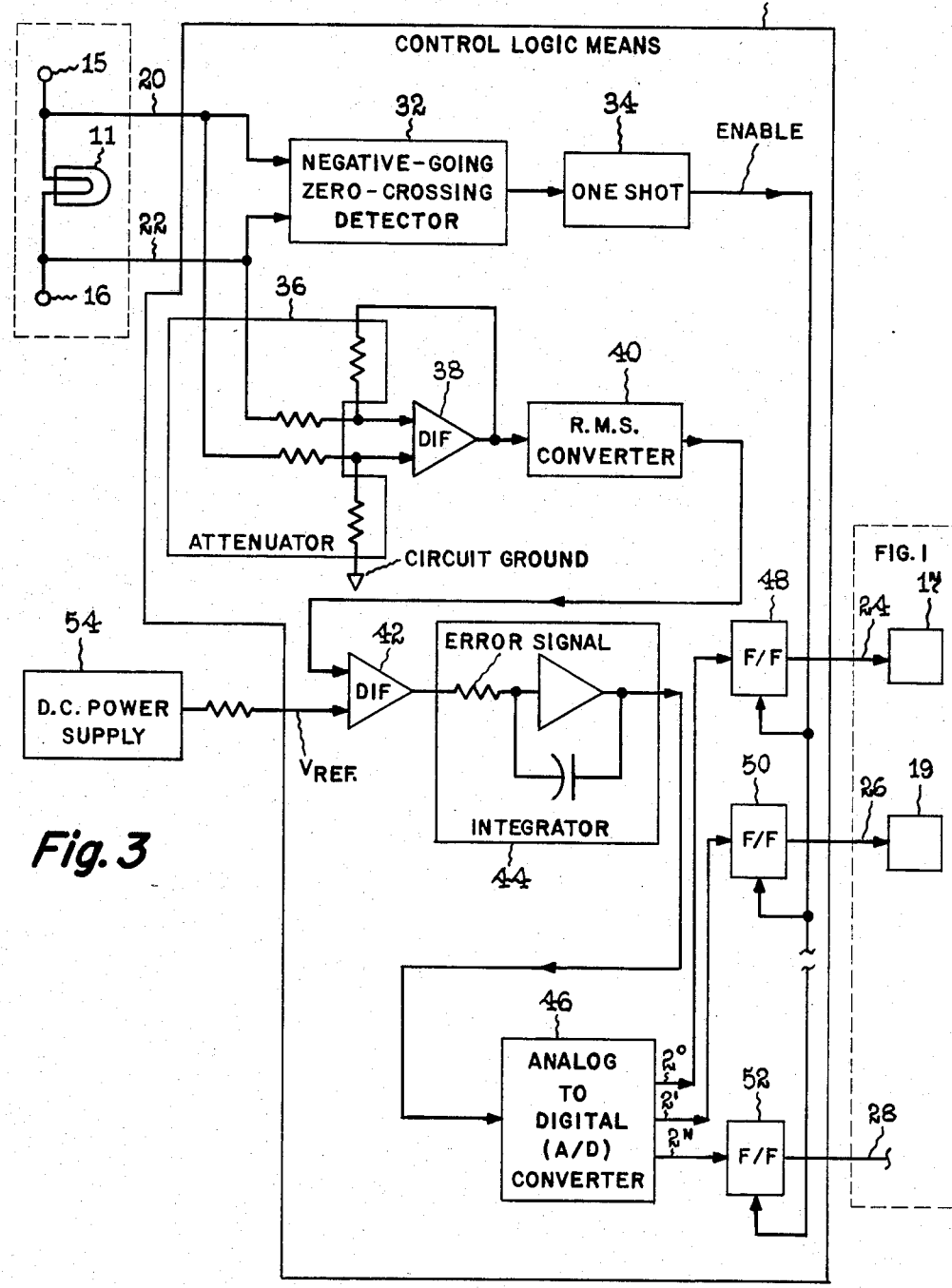
FIG. 3 is a block diagram of the control logic means of FIG. 2.

The operation of the switching means 17 and 19 in response to the control logic means 18 may be described with reference to FIG. 3. FIG. 3 shows the control logic means 18 as comprised of a plurality of elements, each element having a reference number and a circuit function as given in Table 1.

TABLE 1

| Reference No. | Circuit Function |
| --- | --- |
| 32 | Negative-Going-Zero Crossing Detector |
| 34 | One Shot |
| 36 | Attenuator |
| 38 | Differential Amplifier |
| 40 | Root-Mean-Square (R.M.S.) Converter |
| 44 | Integrator |
| 46 | Analog to Digital (A/D) Converter |
| 48, 50 and 52 | Flip-Flop |

The negative-going-zero crossing detector 32, the root-means-square (R.M.S.) converter 40, and the analog to digital (A/D) converter 46 are all well-known. Reference may be made to Op-Amp Application Handbook, author H. W. Fox, published January 1978 by Tab Books of Blue Ridge Summit, Pa., pages 344 and 345 for a description of the operation of a typical negative-going-zero detector. Similarly, reference may be made to pages LB25-1 and LB25-2 of the Linear Applications Handbook 2 of National Semiconductor Corporation, Santa Clara, Calif. for a description of a R.M.S. converter. Further, reference may be made to Digital Electronics for Scientists, authors H. V. Malmstadt and C. G. Enke, published June 30, 1969 by W. A. Benjamin, Inc., New York, N.Y., pages 338 to 342 for a description of an A/D converter.

Figure 2:
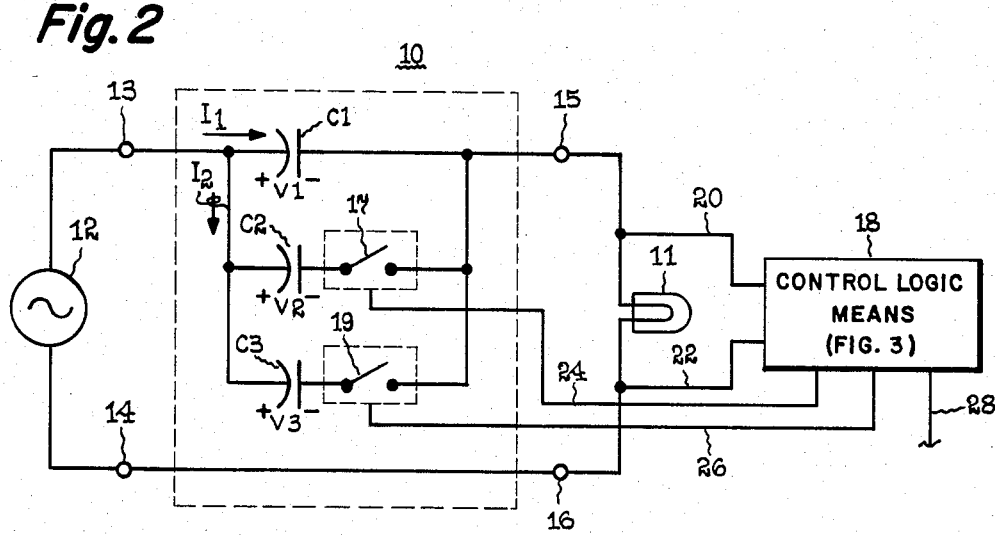
FIG. 2 illustrates the use of control logic means to monitor the lamp current and control the switching means of FIG. 1.

The input signal to the control logic means 18 of FIG. 3 is supplied by signal paths 20 and 22 arranged across the filament 11, whereas, the output signals of the control logic means 18 are routed by means of signal paths 24 and 26 to switching means 17 and 19, respectively, of FIG. 2. The control logic means 18 may also generate one or more output signals applied to one or more signal paths 28 shown in FIGS. 2 and 3 in a discontinuous manner. The practice of this invention contemplates that one or more signal paths 28 may be respectively routed to one or more switching means (not shown), similar to the switching means 17 and 19 of FIG. 2, to control the conductive states of the switching means, which, in turn, interconnect respective additional auxiliary capacitors (not shown), similar to the auxiliary capacitor means C2 and C3 of FIG. 2, into the control circuit of FIGS. 1 and 2.

The input signal paths 20 and 22 are routed to (1) the negative-going-zero-crossing detector 32, and (2) the attenuator 36. The output signal of the detector 32 is routed to the one shot 34. The output signals of the attenuator 36 is supplied across the first and second inputs of the differential amplifier 38 which develops an output signal applied to the RMS converter 40. The RMS converter 40 develops an output signal which is applied to the first input of differential amplifier 42 having as its second input a signal $V_{REF}$ developed by a D.C. power supply 54 located external to the control logic means 18.

The differential amplifier 42 in response to the signals applied across its first and second inputs develops an ERROR signal which is applied to the input of the integrator 44 which, in turn, develops an output signal applied to the input of the analog to digital (A/D) converter 46. The A/D converter 46 in response to the applied signal generates a digital output signal present on one of its output ports shown as $2^0$, $2^1$, and $2^N$, which are respectively applied to a qualifying input of flip-flops 48, 50 and 52. The flip-flops 48, 50 and 52 each develop an output signal respectively applied to signal paths 24, 26 and 28.

The signal present between signal paths 20 and 22 which is applied to the detector 32 is representative of the condition of the current flowing through the filament 11. The detector 32 in response to this condition generates an output signal indicative that the current through the filament 11 is in a zero condition, and which zero condition is further indicative that the voltage of the A.C. source 12 is at its peak condition, typically 170 volts.

The output signal of detector 32 is applied to one-shot 34 which responds by the generation of clock or ENABLE signal to each of the flip-flops 48, 50 and 52. The flip-flops 48, 50, and 52 in response to the ENABLE signal representative of this 170 volt peak condition of A.C. source 12, and further in response to the presence of the output quantities $2^0$, $2^1$ and $2^N$, respectively, of A/D converter 46, to be described hereinafter, respectively render conductive switching means 17, 19 and the switching means (not shown) of signal path 28. At this switching duration and during this 170 volt peak condition, the voltage impressed across the main capacitor C1 and the auxiliary capacitor C2 and C3 are substantially at the same value, that is 170 volts. Accordingly, when switching means 17 and 19 (also switching means of signal path 28) are rendered conductive, the circulating current that is flowing between the auxiliary capacitors C2 and C3 and the main capacitor C1 is relatively low and substantially eliminated.

The signal across the filament 11 and present between signal paths 20 and 22 which is applied to attenuator 36 has a typical value of about 36 volts. This 36 volt signal is reduced by attenuation 36 by a factor of about 10 to 1. The attenuator 36 applies a signal of about 3.6 volts across the inputs of differential amplifier 38, which, in turn, develops an analog-type signal, representative of the voltage across filament 11, which is applied to R.M.S. converter 40. The R.M.S. converter 40 in turn develops an output signal representative of the R.M.S. value of the voltage across filament 11.

The R.M.S. signal of R.M.S. converter 40 is applied to differential amplifier 40 where it is compared against the $V_{REF}$ signal having a typical voltage of 3.6 volts (D.C.). In response to the difference between the signals applied to amplifier 40, the amplifier 40 develops the ERROR signal. The ERROR signal is applied to integrator 44 which in response to a positive voltage type signal representative that the output signal of the R.M.S. converter 40 is greater than the $V_{REF}$ signal, the integrator 44 develops a positive going ramp type signal, which, in turn, is responded to by the A/D converter 46 incrementing its digital contents, for example, the output port quantities sequences from $2^0$ to $2^1$. Conversely, when the ERROR signal is of a negative type signal representative that the output signal of the R.M.S. converter 40 is less than the $V_{REF}$ signal, the integrator 44 develops a negative going ramp type signal, which, in turn, is responded to by the A/D converter 46 decrementing its digital contents, for example, the output port quantities sequences from $2^1$ to $2^0$.

The number of stages and the bit weight of the A/D converter 46, along with the quantity ERROR signal of differential amplifier 42, may be selected to determine the response characteristic of the control logic means 18 to changes in the A.C. voltage 12 variations associated with voltage across the filament 11. For example, the A/D converter may be selected to have a four-stage counter having output port quantities of $2^0$, $2^1$, $2^2$ and $2^3$ wherein the output ports sequences from $2^0$ to $2^1$ when the ERROR signal of differential amplifier 42 increasing, in a positive manner, from about 0 to about 0.1 volts. Upon the occurrence of the output quantity of $2^1$ of the A/D converter 46 and in response to the presence of the ENABLE signal of one-shot 34, the flip-flop 50 renders the switching means 19 conductive so that auxiliary capacitor C3 is effectively interconnected into the circuits of FIGS. 1 and 2. This interconnection correspondingly increasing the total capacitance in series with the filament 11 allowing the voltage across the filament 11 to seek and obtain a desired 36 volt condition.

The overall response of the control logic means 18 may be described with reference to Table 2.

TABLE 2

| | | CONTROL LOGIC MEANS 18 RESPONSE | | | | | |
|---|---|---|---|---|---|---|---|
| Filament 11 Current Condition | $V_{REF}$ of D.C. Power Supply 54 | A/D CONVERTER | | | Current Flowing Through Auxiliary Capacitors | | |
| | | $2^0$ | $2^1$ | $2^N$ | $C^2$ | $C^3$ | $C^N$ |
| Minimum | Less than | No | No | No | No | No | No |
| Intermediate | Greater than | Yes | No | No | Yes | No | No |
| Maximum | Greater than | Yes | Yes | Yes | Yes | Yes | No |

Table 2 generally shows the response to the control logic means 18 to the previously mentioned three conditions of current flowing through the filament 11: (1) minimum, (2) intermediate, and (3) maximum currents. The output states, shown in Table 2, of the A/D converter are determined by the voltage differential between (1) the R.M.S. signal developed by the R.M.S. converter 40 indicative of the current flowing through filament 11; and (2) the D.C. voltage $V_{REF}$. The output states $2^0$, $2^1$, and $2^N$ of the A/D converter in turn determine the current flowing in the auxiliary capacitors C2, C3 and CN.

For example, for the intermedite current condition flowing through filament 11, the R.M.S. signal of the R.M.S. converter is Greater than the $V_{REF}$ voltage of the D.C. supply 54, which, in turn, cause the A/D converter output states $2^0$ to be present (YES), $2^1$ not to be present (NO) and $2^N$ not to be present (NO), which, in turn, cause current to flow (YES) in auxiliary capacitor C2 and conversely inhibit current flow (NO) in auxiliary capacitors C3 and CN.

It should now be appreciated that the response characteristics of the control logic 18 may be selected to establish a desired flow of current through filament 11 in a relatively smooth manner.

Thus the present invention as disclosed heretofore is able to adjust for a.c. source voltage variations. That is, as the a.c. source 12 voltage increases or decreases in magnitude, the auxiliary capacitance C2 can be decreased or increased, respectively, to maintain a substantially constant flow of current or power or both through lamp 11.

Furthermore the load current, power, and brightness can be established both by manual or automatic adjustment of each switching device 17 and 19. More particularly, and as shown in FIG. 2, it is to be understood that a control logic circuit 18 can be used, having a feedback signal fed into means for turning each switching means 17 to a conductive and non-conductive state and thereby automatically adjusting the total capacitance between terminals 13 and 15. Such a feedback signal could, for example, be responsive to the current flow through load 11.

Still further, by the present invention utilizing a capacitively ballasted means of providing low voltage across the lamp 11, undesirably high levels of electromagnetic interference are avoided as compared to the prior art. Additionally, the present invention, and more particularly each switching means 17, can be manufactured at relatively low costs as compared to the prior art by avoiding use of magnetic components such as transformers. Furthermore, the switching means 17 and 19 can be manufactured at relatively low current ratings while maintaining high reliability. That is, by having each switching means 17 and 19 in parallel with C1 and controllably switched on and off to substantially avoid any circulating currents flowing between C1 and C2 and C3, each switching means 17 and 19 can have a relatively low current rating in contrast to such prior art switching means as phase control switching which typically is in series with a higher lamp current.

Another advantage provided by the present invention is in the protection afforded to each switching means 17 and 19 during high frequency fluctuations of the a.c. source 12. More specifically, by each switching means 17 and 19 being electrically connected in parallel with C1, any high frequency voltages of the a.c. source 12, for example due to lightning, make C1 appear substantially as a short circuit and thereby are not applied across any switching means 17 and 19, protecting each switching means 17 and 19 therefrom.

Therefore, while the present invention has been shown and described in a preferred embodiment, various other embodiments and modifications thereof will become apparent to persons skilled in the art and will fall within the spirit and scope of the invention as defined in the following claims.

What I claim as new and desire to secure by Letters Patent of the United States is:

1. A ballast circuit means controlling power from an alternating current source to an incandescent lamp, having a filament, at a voltage magnitude that is less than the alternating current source voltage comprising:
    (a) a first capacitive element electrically serially connected to said lamp which together are across the ballast means input terminals;
    (b) at least one auxiliary capacitive element;
    (c) a control means connected across the filament of said lamp generating discrete control signals in response to conditions of the current flowing through the filament; and,
    (d) switching means responsive to said control signals for selectively and individually electrically connecting each auxiliary capacitive element in parallel across said first capacitive element for one or more complete cycles of the alternating current source waveform.

2. A ballast means as claimed in claim 1 wherein each auxiliary capacitive element has said switching means electrically in series therewith.

3. A ballast means as claimed in claim 1 wherein said switching means provides a low resistance, bidirectional current conduction path therethrough.

4. A ballast means as claimed in claim 3 wherein said switching means are switched independently of each other.

5. A ballast means controlling power from an alternating current source to an incandescent lamp, having a filament, at a voltage magnitude that is less than the alternating source voltage comprising:
    (a) a first capacitive element electrically serially connected to said lamp which together are across the ballast means input terminals;
    (b) at least one auxiliary capacitive element;
    (c) a control means connected across the filament of said lamp generating a control signal in response to conditions of current flowing through the filament;
    (d) switching means responsive to said control signal for electrically connecting each auxiliary capacitive element in parallel across said first capacitive element for one or more cycles of the alternating current source waveform;
    said switching means providing a low resistance, bidirectional current conduction path therethrough, said switching means being switched independent of each other, and;
    wherein each of said auxiliary capacitive element has values selected so that at the time each auxiliary capacitive element is electrically connected in parallel with said first capacitive element by saiid switching means in response to said control means, the voltage potential across each of said auxiliary capacitive element, which is electrically connected in parallel with said first capacitive element, is approximately the same as the voltage potential across said first capacitive element.

6. A ballast means as claimed in claim 1 wherein each of said switching means is switched to a conductive and non-conductive state in response to a control signal.

7. A ballast means as claimed in claim 1 wherein said incandescent lamp is operating at approximately 36 volts, 60 watts; said first capacitive element has a capacitance of approximately 25 microfarads; said at least one or more auxiliary capacitive elements has a total capacitance of approximately 25 microfarads; and said ballast means input voltage is approximately 120 volts at 60 hertz.

* * * * *